US006567636B1

(12) United States Patent
Lui et al.

(10) Patent No.: US 6,567,636 B1
(45) Date of Patent: May 20, 2003

(54) TONER CARTRIDGE WITH A TONER STIRRING MECHANISM

(75) Inventors: Pui Kuong Lui, Kowloon (HK); Yiu Cheong Law, Kowloon (HK)

(73) Assignee: Monitek Electronics Limited, Kowloon (HK)

( * ) Notice: Subject to any disclaimer, the term of this patent is extended or adjusted under 35 U.S.C. 154(b) by 0 days.

(21) Appl. No.: 10/147,817

(22) Filed: May 20, 2002

(51) Int. Cl.[7] .............................................. G03B 15/08
(52) U.S. Cl. ....................................... 399/254; 366/276
(58) Field of Search ................................ 399/254, 263, 399/256, 252, 258, 261; 366/276, 278

(56) References Cited

U.S. PATENT DOCUMENTS 5,682,574 A * 10/1997 Oshida et al. ................ 399/64

* cited by examiner

*Primary Examiner*—Arthur T. Grimley
*Assistant Examiner*—Ryan Gleitz
(74) *Attorney, Agent, or Firm*—Rosenberg, Klein & Lee

(57) ABSTRACT

A toner cartridge with a toner stirring mechanism, which is well mixed with toner contained in a toner container, thereby blocking of the toner can be prevented and fluidity of the toner also can be improved by the movement of the toner stirring mechanism in the toner container, and stable toner flow to a developing device. Furthermore, the toner stirring mechanism further includes a stirring member having a grating shape and a pair of swing rods respectively connected to two sides through the connecting rods, wherein one of the swing rods can be driven via a camshaft of the transmission mechanism being driven through a force externally transmitted, by way of a motor disposed outside of the toner container.

3 Claims, 5 Drawing Sheets

TONER CARTRIDGE WITH A TONER STIRRING MECHANISM

BACKGROUND OF THE INVENTION

1. Field of the Invention

The present invention is directed toward the art of toner cartridges and, more particularly, to an improved toner stirring mechanism for such toner cartridges.

2. The Prior Art

Generally, in an image forming apparatus such as a photographic copying machine, an electro-photographic printer (ex. LED printer, laser beam printer), and an electro-photographic facsimile machine, an electro-photographic word processor, and the like.

A developing device for forming a toner image on the photosensitive drum is disposed around the photosensitive drum. The developing device includes a toner hopper for supplying toner, and a toner cartridge detachably connected to the toner hopper. When the toner in the toner cartridge is depleted, the toner cartridge can be replaced with a new one.

The toner cartridge generally includes a toner container for storing the toner, the toner container having an opening in it that allows the toner to be discharged into the toner hopper. These types of toner cartridges may also include one or more stirring rods (or stirring plates) disposed inside the toner container. In these types of toner cartridges, the stirring rod is often made longer than the length of the container so as to allow at least one end of the stirring rod to extend outside the side walls of the toner cartridge. The stirring rod is typically driven by a force externally transmitted, by way of a motor disposed outside of the toner cartridge, to a stirring gear which supports one end of the stirring rod, and the stirring gear is supported by the toner container. The stirring gear can be a helical gear formed of resin material such as POM, and is attached to the toner container by snap-fitting. As for the transmission of the driving force to the stirring gear, the driving force from the motor is transmitted to the helical gear portion of the stirring gear by way of a gear train or the like.

In the above-described toner cartridge, the toner container must be at least as wide as the widest portion of the stirring rod. Therefore in order to rotatably support the stirring rod and to prevent the toner from leaking out of the toner cartridge, bearing portions must be fitted to each end of the stirring rod. Additionally, the conventional toner cartridge generally uses one stirring rod or stirring plate for stirring the toner, yet the stirring rod has a smaller contacted area with the toner so as to produce the bad mixed toner, but the stirring plate has a larger contacted area with the toner, so as to increase the stirring resistance, and the stirring rod is directly connected to the stirring gear so as to fail to provide a multi-directional reciprocation due to the stirring rod or stirring plate.

SUMMARY OF THE INVENTION

It is an object of the present invention to provide a toner cartridge with a stirring mechanism, which is well mixed with toner contained in a toner container, thereby blocking of the toner can be prevented and fluidity of the toner also can be improved by the movement of the toner stirring mechanism in the toner container, and stable toner flow to a developing device of is accomplished.

In accordance with one aspect of the present invention, which provides a toner cartridge comprising a toner container, a toner stirring mechanism and a transmission mechanism. The toner container comprises two side walls and a chamber defined between two side walls for containing toner. The toner stirring mechanism comprises a stirring member having a grating shape defined with a predetermined contact area for stirring the toner, and a pair of swing rods each having a upper end pivotally connected on each of the side walls of the toner container, and a lower end thereof pivotally connected to each of two sides of the stirring member. The transmission mechanism comprises a camshaft being mounted on one side wall of the toner container and having an inside end matched with one swing rod of the toner stirring mechanism, and a stirring gear integrally formed on an outside end of the camshaft for driving the camshaft to rotate.

BRIEF DESCRIPTION OF THE DRAWINGS

The invention may take physical form in certain parts and arrangement of parts, a preferred embodiment and method of which will be described in detail in this specification and illustrated in the accompanying drawings that form a part hereof, and wherein.

DETAILED DESCRIPTION OF THE PREFERRED EMBODIMENT

Figure 1:
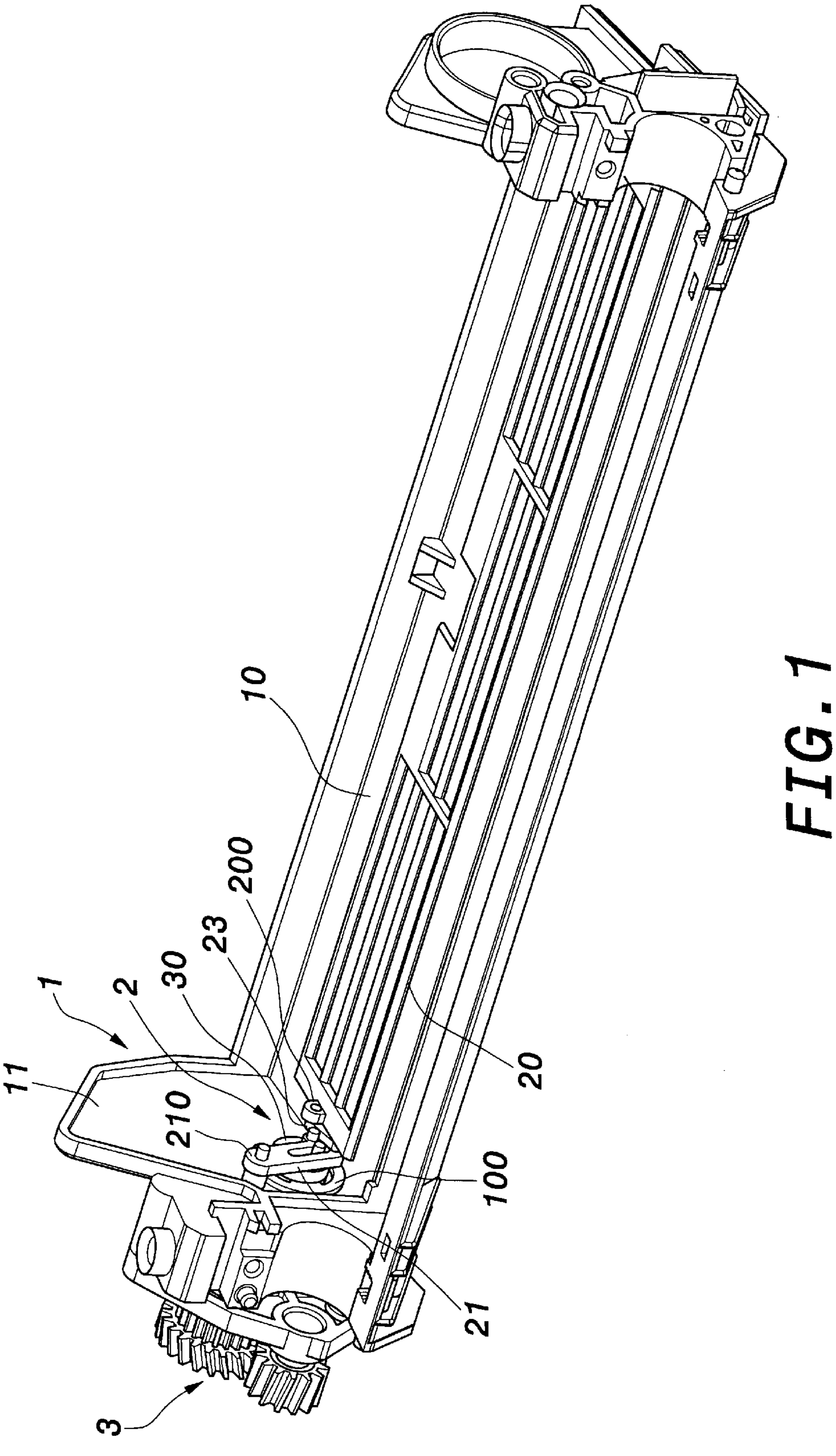
FIG. 1 is a perspective view of the toner cartridge due to the present invention.

The present invention will now be described in detail with respect to the accompanying drawings in which like reference numerals designate identical or corresponding parts throughout the several views.

Figure 2:
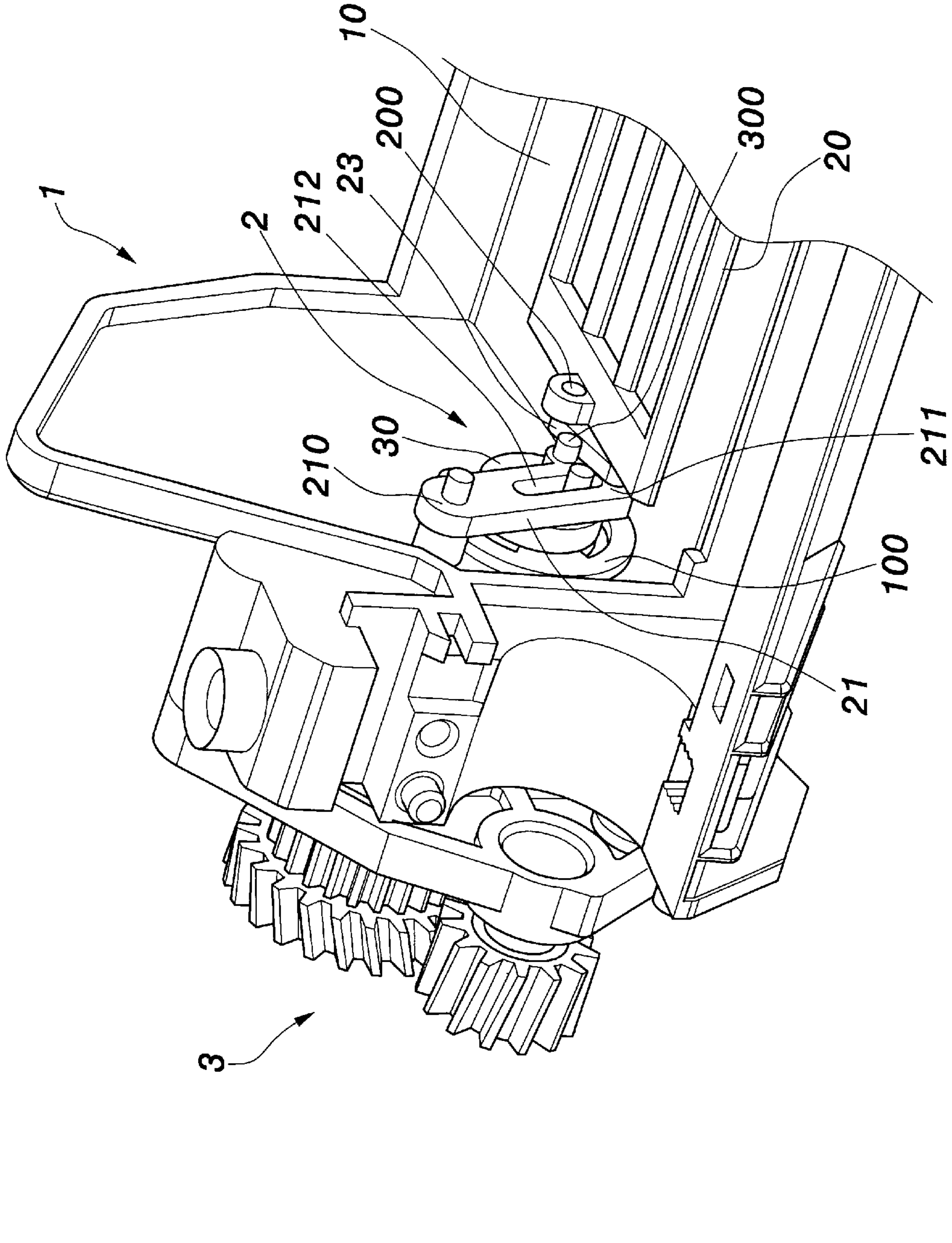
FIG. 2 is a partial view of FIG. 1 due to present invention.
Figure 3:
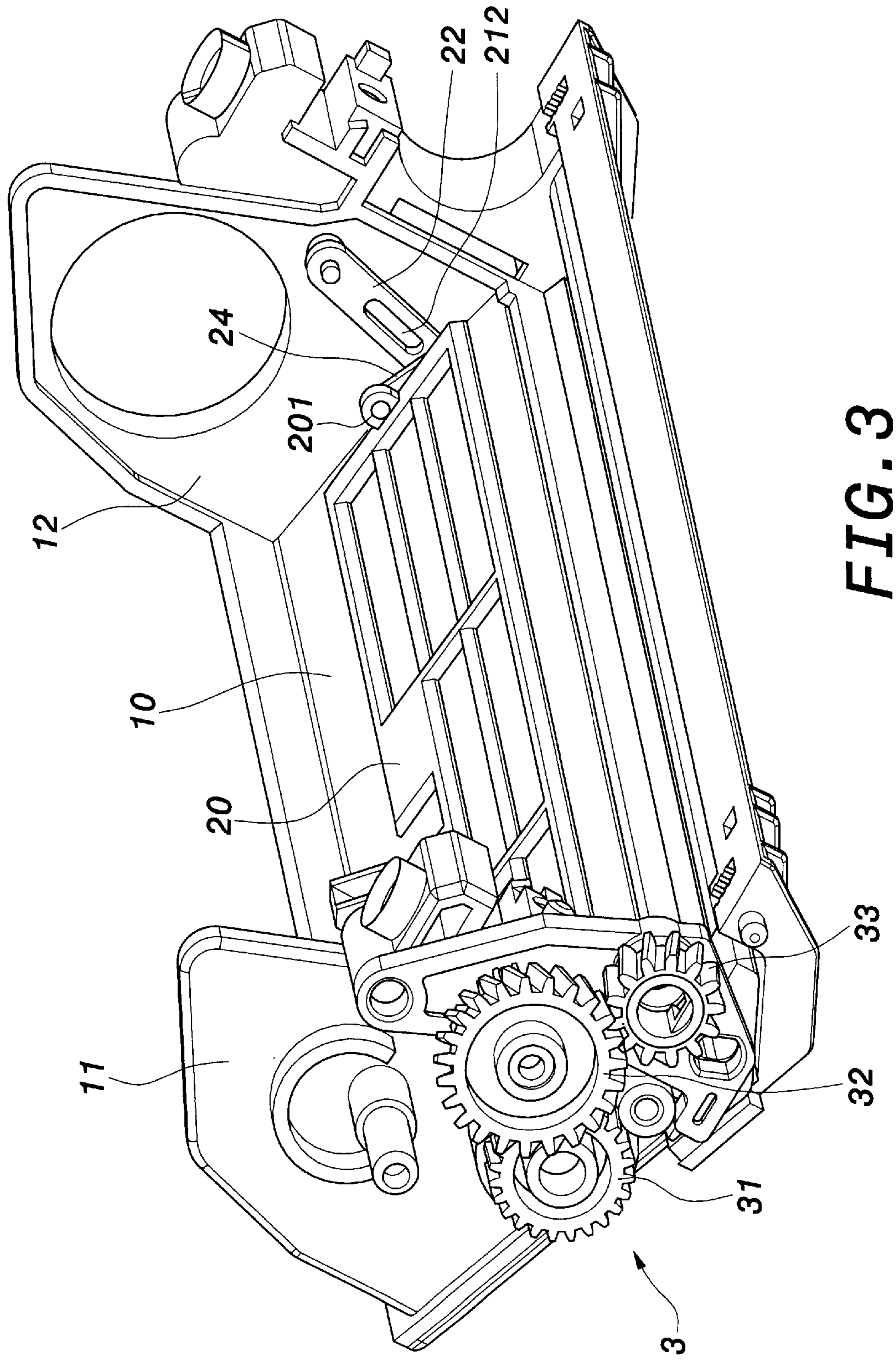
FIG. 3 is another perspective view of FIG. 1 due to present invention.
Figure 4:
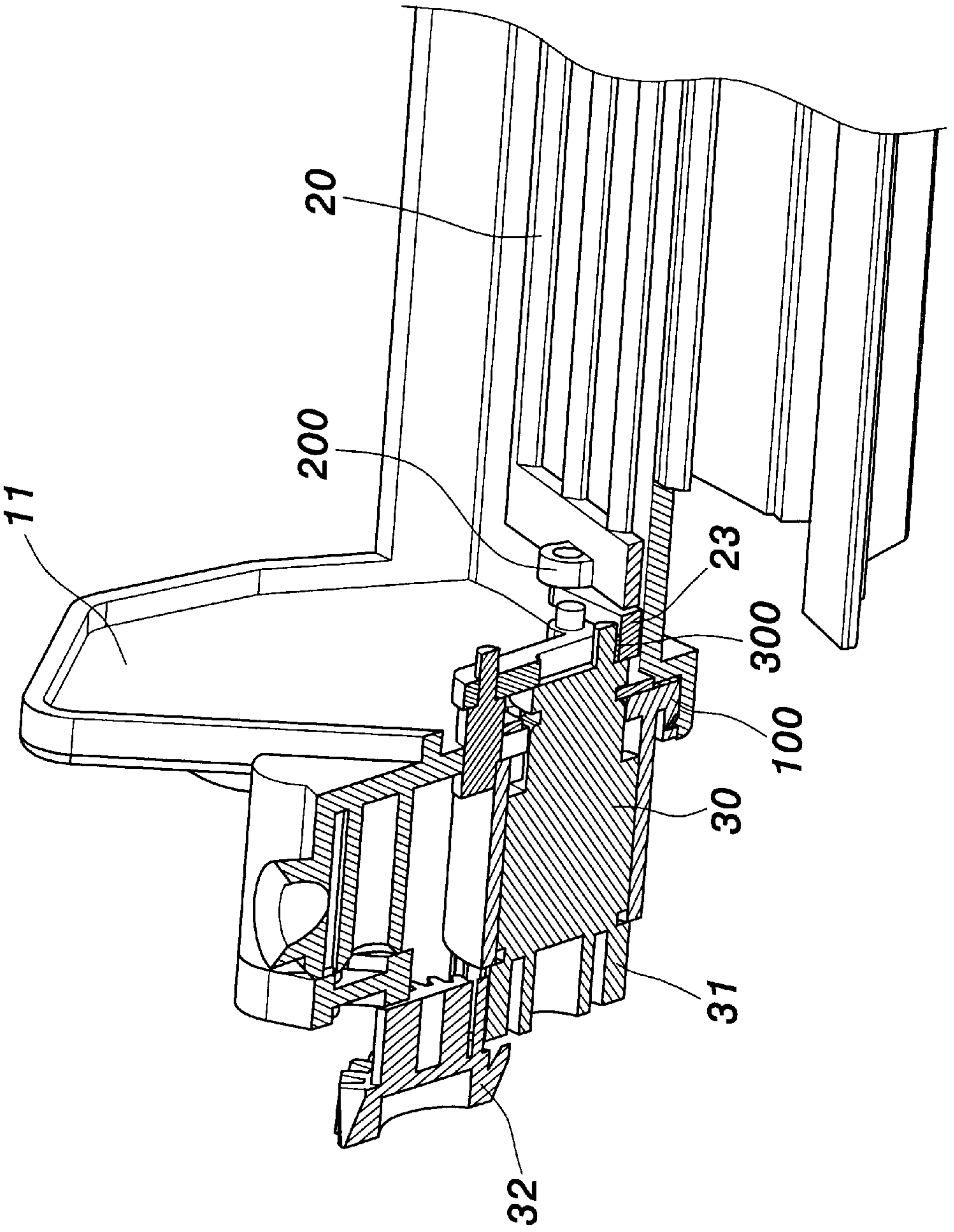
FIG. 4 is a cutaway view of FIG. 1 due to present invention.
Figure 5:
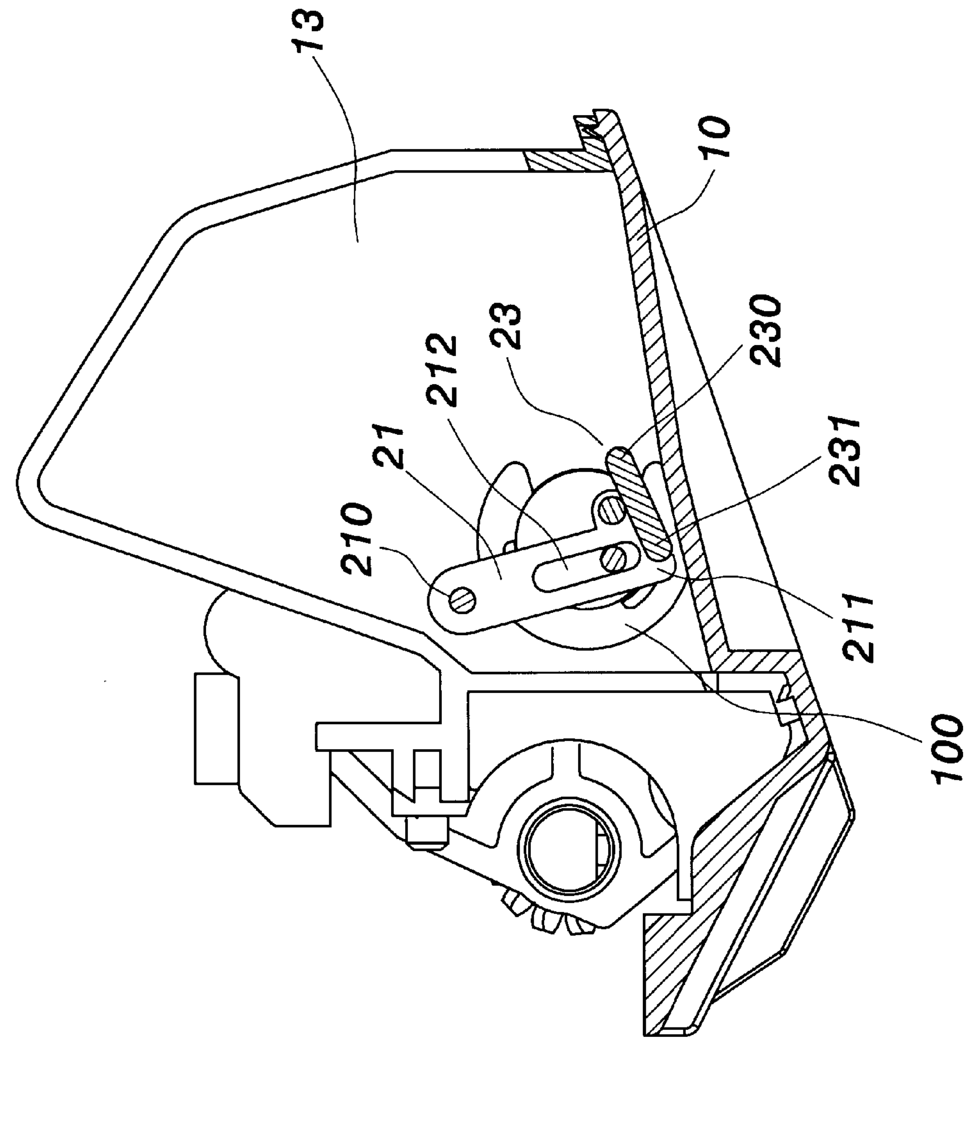
FIG. 5 is a horizontal section of the toner cartridge due to present invention.

Referring to FIGS. 1 through 5, the present invention provides a toner cartridge comprising a toner container 1, a toner stirring mechanism 2 and a transmission mechanism 3.

The toner container 1 defines a longer length in a lateral direction, and is constituted by a main base 10, an upper cover (not shown) and two side walls 11, 12, thereby to define a chamber 13 therebetween for containing toner. The main base 10 can be made of a suitable synthetic resin having the shape of a box with its upper surface open, and the upper cover that can similarly be made of a suitable synthetic resin is positioned on the upper surface of the main base 10 and is secured to the main base 10 by a suitable method such as ultrasonic welding to close the upper surface of the main base 10, or the like.

The toner stirring mechanism 2 is disposed in the toner container, which comprises a stirring member 20, a pair of swing rods 21, 22 and a pair of connecting rods 23, 24. The stirring member 20 is a grating shape defined with a predetermined contact area for well mixedly stirring the toner contained in the chamber 13 of the toner container 1 and has a width being shorter than a length between two side walls 11, 12 of the toner container 1 in the lateral direction, and a pair of pivotal portions 200, 201 respectively disposed on two sides of the stirring member 20. The swing rods 21, 22 each have an upper end 210 pivotally connected onto each of the side walls 11, 12 of the toner container 1, a lower end 211 and a guiding groove 212 being formed thereon. The connecting rods 23, 24 each have two end portions 230, 231, one end portion 230 thereof pivotally connected to one pivotal portion 200 of the stirring member 20, the other end portion 231 thereof attached to the lower end 211 of the swing rod 21.

The transmission mechanism 3 comprises a camshaft 30 and a stirring gear 31. The camshaft 30 is mounted on one side wall 11 of the toner container 1 through a C-shaped locking member 100 integrally formed with the main base 10, and has a protruding rod 300 disposed eccentrically on an inside end thereof, wherein said protruding rod 300 of the camshaft 30 is arranged in said guiding groove 212 of the swing rod 21 for dragging each other. The stirring gear 31 is a spur gear integrally formed on an outside end of the camshaft 30 for receiving a driving force to rotate said camshaft 30, and is engaged with a gear train, as an intermediate gear 32 and a sleeve gear 33, which is driven by a force externally transmitted, by way of a electric motor (not shown) disposed at an outside of the toner cartridge.

Furthermore, the toner cartridge is mounted on a required position of a developing device (not shown), and the sleeve gear 33 is coupled to the electric motor (not shown) via the intermediate gear 32 to engage with the stirring gear 31. When the electric motor is energized, the camshaft 30 is rotated through the gear train in the clockwise or anticlockwise direction, so that the camshaft 30 can drive the swing rods 21, 22 to swing forward and backward, in the meantime, to drag the stirring member 20 to swing and rotate through the connecting rods 23, 24, respectively.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A toner cartridge, comprising:

a toner container being constituted by a main base, an upper cover and two side walls, thereby to define a chamber therebetween for containing toner;

a toner stirring mechanism being disposed in the toner container, including:

a stirring member with a grating shape defined as a predetermined contact area for mixedly stirring the toner, and having a pair of pivotal portions disposed on two sides thereof, respectively;

a pair of swing rods each having an upper end pivotally connected on each of the side walls of the toner container and a lower end, at least one of the swing rods having a guiding groove being formed therein; and a pair of connecting rods each having two end portions, one end portion thereof being pivotally connected to each of the pivotal portions of the stirring member, the other end portion thereof being attached to the lower end of each of the swing rods; and a transmission mechanism, including:

a camshaft being mounted on one side wall of the toner container, and having a protruding rod eccentrically disposed on an inside end thereof, wherein said protruding rod of the camshaft is arranged in said guiding groove of one of the swing rods; and a stirring gear being a spur gear integrally formed on an outside end of the camshaft for receiving a driving force to rotate said camshaft;

whereby the camshaft drives the swing rods to swing forward and backward, and to drag the stirring member to swing and rotate through the connecting rods.

2. The toner cartridge as claimed in claim 1, wherein the stirring member has a width being shorter than a length between two side walls of the toner container in a lateral direction.

3. The toner cartridge as claimed in claim 1, wherein the camshaft is mounted on one side wall of the toner container through a C-shaped locking member integrally formed with the main base of the toner container.

* * * * *